United States Patent [19]

Bauer et al.

[11] 4,386,766
[45] Jun. 7, 1983

[54] LENGTHWISE ADJUSTABLE GAS SPRING

[75] Inventors: Fritz Bauer; Hans-Peter Bauer, both of Altdorf; Hans J. Bauer, Röthenbach, all of Fed. Rep. of Germany

[73] Assignee: Fritz Bauer & Söhne oHG, Altdorf, Fed. Rep. of Germany

[21] Appl. No.: 187,183

[22] Filed: Sep. 15, 1980

[30] Foreign Application Priority Data

Oct. 20, 1979 [DE] Fed. Rep. of Germany ....... 2942455

[51] Int. Cl.³ .......................... A47B 9/10; A47C 3/30; F16F 9/44
[52] U.S. Cl. ................................. 267/64.12; 188/300; 188/322.16; 248/631; 251/324; 403/331
[58] Field of Search ................... 188/300, 284, 322.11, 188/322.13–322.18, 322.19, 322.22, 312, 315, 188/314, 316; 267/131–133, 117, 120, 124, 129, 8 A, 267/64.12, 64.15, 64.22; 297/345, 347; 248/631, 562; 403/331; 16/66; 251/324; 277/70–79, 102, 277/117–122, 123–125, 154, 168–172, 178, 190–199, 277/227–228, 231

[56] References Cited

U.S. PATENT DOCUMENTS

| | | | |
|---|---|---|---|
| 1,899,846 | 2/1933 | Boyd | 403/331 |
| 2,702,099 | 2/1955 | Lautz | 188/284 |
| 3,628,637 | 12/1971 | Axthammer | 188/300 |
| 3,656,593 | 4/1972 | Bauer | 188/300 |
| 3,711,054 | 1/1973 | Bauer | 248/400 |
| 3,999,745 | 12/1976 | Mahoff | 267/129 X |
| 4,166,612 | 9/1979 | Freitag et al. | 188/300 X |
| 4,318,536 | 3/1982 | Bauer | 267/64.12 |

FOREIGN PATENT DOCUMENTS 2225342 12/1973 Fed. Rep. of Germany.

Primary Examiner—Douglas C. Butler
Attorney, Agent, or Firm—Browdy and Neimark

[57] ABSTRACT

A lengthwise adjustable gas spring consists of a housing containing gas under pressure, which is formed by an outer tube 2 and a coaxially disposed inner tube 3 with an annular channel 4 therebetween. A closed piston 5 sealed against the inner tube and axially movable within same, is connected to a piston rod 9, which extends through a seal formed by a plug 10 at one end of the housing. A valve 23 is disposed at the other end of the housing and is used for the regulated connection via the annular channel 4 of two partial housing chambers 20a and 20b disposed on either side of the piston within the inner area of the housing. A valve lifter 22 is embodied within the valve body and is sealed against the valve body and opens or closes gas transfer ports. The valve body 23 and the plug 10 are axially supported against the inner tube 3 and are sealed against the inner surface of the outer tube 2. In order to avoid use of separate seals, the valve body e.g. 23, 23' and/or the plug 10 fit without seals against the inner surface of the outer tube 2 and are radially sealed in relation to it by axial bracing, whereby the valve body 23, 23' and/or the plug 10, on the one hand, and the outer tube 2, and the other hand, consist of materials of differing hardness.

15 Claims, 3 Drawing Figures

LENGTHWISE ADJUSTABLE GAS SPRING

FIELD OF THE INVENTION

The invention relates to a longitudinally adjustable gas spring particularly of the type suitable for variably adjusting the height of chairs or the like.

BACKGROUND OF THE INVENTION

Longitudinally adjustable gas springs are basically known from U.S. Pat. No. 3,656,593 and are very well known through their wide usage. A basic problem of these longitudinally adjustable gas springs has resided in the fact that a large number of seals are required which have to be disposed between the plug and the respective inner wall of the outer tube, the body of the valve and the respective inner wall of the outer tube and the body of the valve and the inner tube. As a rule, additional seals are disposed between the piston rod and the piston. Problems are caused in two ways by the use of such seals, because on the one hand respective parts have to be cut for grooves to receive the annular seals, which requires machining; on the other hand the danger exists that seals might be damaged during installation, which would completely ruin the lengthwise adjustable spring. A particular problem is that small defects often mean that the damage is only apparent after some time, after the gas spring has already left the factory and has been installed on the job. This danger could in the past only be avoided in reality by a mostly manual installation process.

A basically similar longitudinally adjustable gas spring is known from DE-PS 22 25 342, the valve body of which is disposed conically tapered. The outer tube of the gas spring is pressed against this valve body in order to form a conical part of the housing, which can be employed as a tapered cone.

Furthermore, copending U.S. Ser. No. 114,652, now U.S. Pat. No. 4,318,536, describes a longitudinally adjustable gas spring of this same general type, which is equipped additionally with a so-called limit suspension. Here, on the one hand a locking element is combined with the piston, and on the other hand a valve area limiting sleeve is disposed on the side towards the valve.

SUMMARY OF THE INVENTION

It is an object of the present invention to provide an improved longitudinally adjustable gas spring of the general type referred to above, constructed in such a way that the employment of separate seals is largely avoided.

The problem is solved in accordance with the present invention by application of radial sealing using axial bracing and materials of different hardness for the valve body or plug and for the outer tube.

Plugs and/or valve bodies, and preferably both, are disposed braced radially against the inner wall of the outer tube to produce a gas-tight connection. This leads to a considerably simplified manufacturing process, since the annular channels for the annular seals which can practically only be formed by machining, are not needed in such a construction. The measures according to the present invention therefore make it possible to replace the machining process with a process not requiring cutting, especially for plugs and valve bodies. Furthermore, installation is considerably simplified, especially a change from mostly manual installation to an automated installation is thereby made possible, since the danger of damaging seal rings during installation no longer exists. A change to automated installation is now possible because these problems no longer exist.

An especially simple form of radial bracing between the plug and the respective area and a dependable gas-tight connection in this area is achieved by providing the plug in the shape of a truncated cone tapering toward the adjacent housing end and disposed in the corresponding section of the outer tube.

The radial bracing of the valve body can be achieved especially well with the use of a two-part valve, the parts of which meet along associated wedge surfaces for the radially sealing fit of one of the two elements of the valve body against the inner surface of the outer tube.

Use of the aforementioned features in combination is especially advantageous since it makes possible the insertion, from the end of the valve, of a pre-assembled unit consisting of inner tube, plug, piston rod with piston and valve, into the outer tube, which has a conically tapering section at the end, where the piston rod emerges. The radial bracing and gas-tight closure at the plug and the valve body can then easily be achieved at the end towards the valve by a simple flanging.

An especially simple embodiment of the valve body which makes possible a simple wedging of the seal flange against the respective inner wall of the outer tube, is made possible by use of an annular seal flange which forms a part of the outer element of the valve body, which flange abuts with its outer surface against the inner surface of the outer tube, the wedge surface for mating with the inner valve body element being disposed on the surface of such seal flange facing towards the center.

In a further improvement a transfer port connects the annular channel between the inner and outer tubes with the valve. Because the transfer port can be disposed in an area already present, this makes it possible to construct the port without cutting during die-casting.

In a variant of the construction set forth immediately above, an annular seal flange is disposed at the inner element of the valve body, and which fits with its outer surface against the inner surface of the outer tube, the corresponding wedge surface of which faces towards the center. This construction is especially advantageous in case the outer part or element of the valve body is not made from a plastic, but from some harder material, such as die-cast zinc.

If desired, the valve body is provided with a section, which is conically tapered towards the inner area of the housing, and which is tightly and surface-sealingly disposed in a corresponding conical expansion of the inner tube. This construction is usable on the one hand in combination with one or more of the features described above, or it can also be used in other constructions.

If desired, the piston may be connected to the piston rod by means of a plug connection which may be radial or axial, or by means of an elastic arresting connection. Through the use of such a connection and/or the conically tapered valve body described immediately above, the advantage is attained, either in connection with the other features of the invention or by themselves in their different variations, that no seal is necessary between the piston rod and the piston. Further, these features negate any twist problems (and thereby sealing problems) between the piston rod and the piston and the guidance of the piston rod.

If the gas spring has been equipped with a limit suspension of the kind mentioned above and disclosed in Ser. No. 114,652 now U.S. Pat. No. 4,318,536, then other features may be used which lead to a further simplification of their construction. Thus, the sealing element may be embodied as one piece with the piston and/or the valve area limiting sleeve embodied as one piece with the valve body, e.g. the valve limiting sleeve may be embodied as one piece with the inner element of the valve body.

BRIEF DESCRIPTION OF THE DRAWINGS

Further advantages and characteristics of the present invention can be seen from the description of an embodiment, using the drawing.

DESCRIPTION OF THE PREFERRED EMBODIMENT

Figure 1:
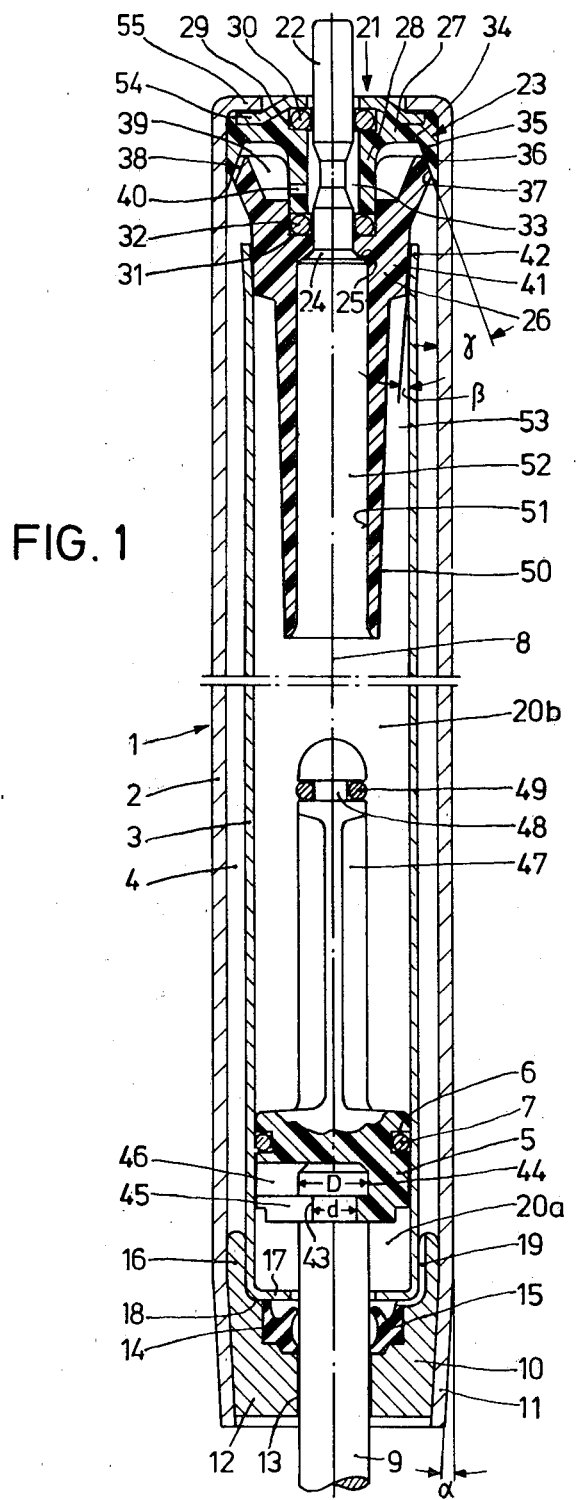
FIG. 1 shows a longitudinal cross section of a lengthwise adjustable gas spring according to the present invention.

A longitudinally adjustable gas spring, according to the present invention, includes a housing 1, which essentially consists of an outer tube 2 suitably formed of a hard material, preferably steel, and having concentrically disposed therewithin an inner tube 3. A small annular channel 4 is formed between the outer tube 2 and the inner tube 3 because of their different diameters. A generally cylindrical piston 5, to be described in more detail below, is disposed axially movably in the inner tube 3, the outer circumference of which is sealed gas-tight against the inner tube 3 by means of a seal ring 7 disposed in an annular groove 6 in the piston 5. The piston 5 is fastened, in a manner also to be described below in more detail, to one end of a piston rod 9 which runs coaxially to the line of symmetry 8 of the housing 1. This piston rod 9 protrudes from one end of the housing 1.

Housing 1 is closed at the end through which the rod 9 protrudes by a plug 10. Moreover, the outer tube 2 is provided at this end with a section 11 which is tapered inwardly towards the end of housing 1 where the piston rod exits, and which is of conical shape, i.e. in the form of a truncated cone. Half the opening angle α of this conical section is approximately 1° to 2.5°. The plug 10, advantageously made from a hard or elastic plastic, is also embodied in its outer circumference in the form of a truncated cone, so that it presses with its entire outer surface in a gas-tight manner against the inner surface of the frusto-conical section 11, when it is introduced into such section 11. In this manner a gas-tight connection is achieved between the respective inner surface of section 11 of the outer tube 2, normally made from steel, and the plug 10, made from an appropriate resilient plastic material, without any other sealing means, especially without separate annular seals.

The plug 10 is formed with a depression 14 in its center and has a coaxial hole 13 in its bottom end 12 of sufficient diameter for the piston rod 9, disposed towards the end where the piston rod exits. A multiple-lip seal 15 is disposed in the approximately cylindrically shaped depression 14 of the plug 10, located ahead of the bottom end 12, which seal 15 lies gas-tight against the wall of plug 10 delimiting the depression 14, and also gas-tight against the piston rod 9, so that no gas can escape between piston rod 9 and guide hole 13.

Adjacent to the depression 14 the plug 10 has a roughly ring-cylindrical rim 16, which lies against the inner wall of the outer tube 2 immediately in front of conical section 11. The inner tube 3 is seated in this rim 16 by force. The inner tube 3 is provided at this end with a flange 17, directed radially towards the interior, which flange 17 presses axially against a stop collar 18 formed in the plug 10 of the transition area between the aperture 14 and the rim 16, whereby the axial placement of the inner tube 3 relative to the plug 10 is fixed. The multiple-lip seal 15 also presses against the plug 10 radially and axially towards the interior directed flange 17, so that it is fixed firmly in both axial directions. The inner diameter of the flange 17 is larger than the diameter of the piston rod 9, so that the axial movement of the latter is not hindered.

At least one port 19 is disposed on the inner surface of the rim 16 and the neighboring stop collar 18, through which gas can flow from the annular channel 4 into a partial housing area 20a between the piston 5 and the plug 10 with multiple-lip seal 15. As can be seen from the above description, the radial thickness of the rim 16 approximately corresponds to the aperture of the annular channel 4.

A valve 21 is provided at the other end of the housing 1 and consists mainly of an essentially cylindrical valve lifter 22 and a two-part valve body 23 comprising an inner element 26 and an outer element 27. The valve lifter 22 has at its inner end an impact plate 24, which lies against a corresponding striking face 25 on the inner element 26 of the valve body 23, when the valve 21 is closed. The outer element 27 of the valve body 23 has a guide sleeve 28 for the essentially cylindrical valve lifter 22. On the outer face of the guide sleeve 28 an annular seal 30 is disposed in an annular groove 29, which effects a gas-tight closure between valve lifter 22 and valve body 23 to the outside.

An annular groove-like area 31 is delimited by the upper surface of an inwardly projecting flange of the inner element 26 and by the rim or inside end of the guide sleeve 28 of the outer element 27, pointing towards the inner housing area 20. Another annular seal 32 is disposed within the so-formed groove 31 and lies against the valve lifter 22. An indent is provided in the valve lifter 22, located between the two annular seals 30 and 32 while the valve lifter 22 is in the closed position. The indent provides a bridging cavity 33, which bridges the annular seal 32 when the valve lifter 22 is pushed in the direction of the inner housing area 20.

The outer element 27 of the valve body 23 has, in addition to the guidance sleeve 28, an end section 34 and an outer seal flange 35, which lies with its cylindrical outer surface against the inner surface of the outer tube 2 in this area. This seal flange 35 has an inner wedge surface 36, which widens in the direction of the plug 10, against which lies a corresponding wedge surface 37, disposed on the inner element 26 of the valve body 23, the wedges 36, 37 meeting along a conical surface inclined at the angle γ. In at least one of the wedge surfaces 36, 37 there is disposed a transfer port 38, which is open on the one side towards the annular channel 4 and which leads on the other side via an area simply reinforced by ribs 39 and a throttle bore 40 to the bridging cavity 33, so that the annular channel 4 on the one hand and the bridging cavity 33 on the other hand are constantly connected to each other.

The inner tube 3 is slightly widened in the form of a truncated cone 42 at the end where the valve 21 is located; the opening angle of taper β roughly corresponds to the opening angle α mentioned before. The inner element 26 has a corresponding section 41, also generally frusto-conical, which is force-seated in the corresponding frusto-conical portion 42 of the inner tube 3. Since the inner element 26 and the outer element 27 of the valve body 23 are suitably made from the same kind of resilient plastic material as plug 10, this also provides a gas-tight connection between the valve body 23 and the corresponding end of the inner tube 3. The pressing of outer element 27 of the valve body 23 against the inner element 26 thereof fixes the annular seal 32; and the two wedge surfaces 36, 37 abut against each other and thereby lightly spread the seal flange 35 radially so that its outer surface lies gas-tight against the corresponding inner wall of the outer tube 2, so that here, too, an outer, gas-tight connection is created.

Referring to the connection of the piston rod 9 to the piston 5, it is seen that an annular groove 43 is provided in the end of the rod 9 lying towards the piston 5, ahead of which is disposed a tip section 44, having the normal diameter D of the piston rod 9. A slit 45, extending on one side radially from the center to the outer edge is disposed on the end of piston 5 facing the plug 10, the axial length of which roughly corresponds to the axial length of annular groove 43 and the width of which corresponds to the diameter d of the piston rod 9 in the area of annular groove 43. A recess 46, next to and parallel with the slit 45, also extends radially from the center, the axial length of which corresponds to the axial length of the section 44, and the width of which corresponds to the width of diameter D of the piston rod tip section 44. This embodiment makes it possible to make the connection between piston 5 and piston rod 9 in a simple way by a sideways sliding of the piston 5 onto the piston rod 9, thereby providing a connection which is axially solid. Since the piston 5 is guided in the inner tube 3 and the piston rod 9 in the guidance hole 13 of the plug 10, it does not matter that the piston 5 and the piston rod 9 are not firmly connected with each other radially. Since slit 45 and recess 46 are disposed between the plug 10 and the annular groove 6 with annular seal 7 in piston 5, the partial housing areas 20a and 20b of the inner housing area 20 are separated gas-tight from one another. The piston 5 is provided on its inner end with a coaxially extending sealing element 49, which extends into the partial housing area 20b and serves as a sealing function. This sealing element 47 and the piston 5 are desirably molded in one piece from a plastic material. An annular groove 48 with an inlaid seal ring 49 is disposed near the free end of the sealing element 47. Such a seal ring 49 can, if desired, be molded in one piece together with the others.

A valve area limiting sleeve 50 corresponding to the sealing element 47 is disposed in a single unit with the inner element 26 of the valve body 23 and is next to its conical section 41. This valve area limiting sleeve 50 has a cylindrical inner surface 51, which corresponds in its diameter with the seal ring 49, so that when the sealing element 47 enters the valve area limiting sleeve 50, the inner area 52 of the sleeve becomes tightly sealed from the partial housing area 20b. Since the remaining space 53 between the comparatively thick-walled valve area limiting sleeve 50 and the inner tube 3 is obviously smaller than the space covered by the corresponding annular diameter of the piston 5 during its axial movement, a comparatively high compression of the gases present in the remaining space 53 after the sealing entry of the sealing element 47 into the valve area limiting sleeve 50 takes place, which leads to a so-called limit suspension. The physical details thereof are described in detail in the copending U.S. application Ser. No. 114,652.

The mounting of the described lengthwise adjustable gas spring with limit suspension takes place in a simple way by first assembling the piston 5 with the integral sealing element 47 and the piston rod 9 in the manner already described. This unit is inserted into the inner tube 3 (from the top as illustrated in FIG. 1) which has already been equipped with the plug 10 and the multiple-lip seal 15 in the area of the flange 17.

Following this, the valve 21 is mounted in the conical expanded portion 42 of the inner tube 3 and this unit is inserted into the outer tube 2 until the plug 10 is seated tightly in the conically tapered section 11 of the outer tube 2. Next, a protective plate 54 is placed from the outside against the end section 34 of the outer element 27 of the valve body 23 and the corresponding rim 55 of the outer tube 2 is flanged under the necessary axial pressure. The flanged rim 55 provides axial bracing. During this flanging with simultaneous exertion of an axial pressure the final seal between the plug 10 and section 11 is achieved and at the same time the gas-tight connection between the inner element 26 and the inner tube 3 is made and, finally, the gas-tight connection between the valve body 23 and the outer tube 2 is achieved through the spreading of the seal flange 35. Therefore, in all these areas no special seals are necessary. The protective plate 54 can, at the same time, delimit the annular groove 29, which serves to receive the annular seal 30, so that this annular groove will not have to be made later by machining, i.e. such groove 29 can be made during the construction of the outer valve element 27 by molding from a plastic material. After such assembly, the gas spring is filled with gas under pressure.

The function of such a lengthwise or longitudinally adjustable gas spring is principally disclosed in U.S. Pat. No. 3,656,593. As is stated in such U.S. Pat. No. 3,656,593, if for example the lifting device in substantially its fully drawn out position is required to be shortened, i.e. to the height of a table top, or a chair seat is required to be steplessly reduced, then by means of the lever linkage which is not illustrated, the valve is opened by pushing the valve stem 22 into the housing. By pushing down the table top, chair seat the like by hand, the piston 5 drives the gaseous housing contents disposed in front of the piston, through the bridging cavity 33 and through the throttle bore 40 and the transfer port 38 and into the annular channel 4, and from there through the port 19 and ultimately into the partial housing area 20a behind the piston. On steplessly reaching the desired height of the table top, chair seat or the like, the valve is again closed, whereupon due to the loading of the gaseous housing contents, the table top or chair is locked in the new position. The preferred use of such a lengthwise adjustable gas spring as an integral part of a chair column is described in U.S. Pat. No. 3,711,054.

Figure 2:
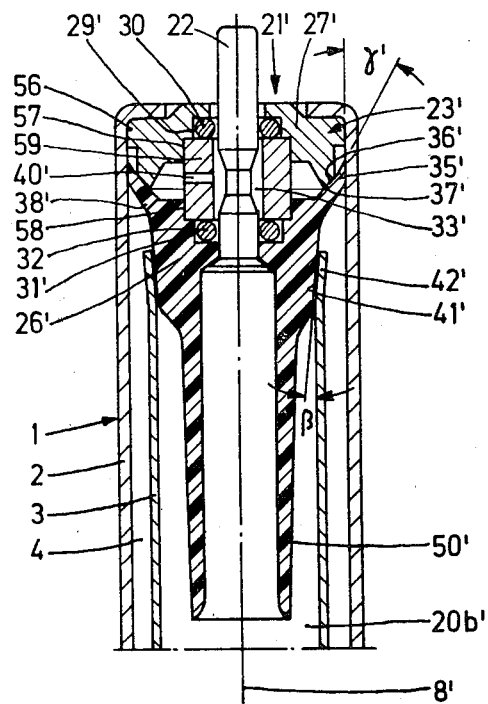
FIG. 2 shows an altered form of the valve of the gas spring.

In another embodiment of the valve, shown in FIG. 2, and designated valve 21', the inner element 26' and the outer element 27' of the valve body 23' are constructed somewhat differently from the embodiment according to FIG. 1. The outer element 27' here consists of a hard material such as metal, for instance, die-cast zinc, or hard plastic, and has a centering collar 56 disposed at the inner wall of the outer tube 2. It further has an annular cylindrical recess 57, open toward the interior, which corresponds in size to another annular cylindrical recess 58, open toward the exterior, in the inner element 26'. For reasons of assembly, inner element 26' and outer element 27' are connected by means of a clamping sleeve 59, which is clamped in the two recesses 57, 58. A throttle bore 40' passes through the clamping sleeve 59. Annular grooves 31', 29', open towards the bridging cavity 33', are respectively disposed in the inner element 26' and the outer element 27', and contain annular seals 32, 30. The respective annular grooves 29', 31' are sealed towards the bridging cavity 33' by the clamping sleeve 59.

A wedge surface 36' is disposed on the outer element 27', which—in contrast to the embodiment according to FIG. 1—is inclined at an angle γ' in the direction of the partial housing area 20b' towards the axis 8'. The same goes for a wedge surface 37', disposed on the inner element 26', which abuts the wedge surface 36'. The wedge surface 37' of the inner element 26' forms a surface of a seal flange 35' of the inner element 26'. Because of the inclination of the wedge surfaces mentioned, the seal flange 35' is also pressed sealingly against the inner surface of outer tube 2, when inner element 26' and outer element 27' press against each other through their surfaces 36', 37'.

In this embodiment too, the valve area limiting sleeve 50' may be formed as one piece together with the inner element 26' of the valve body 23'. This part is desirably formed of a sufficiently soft or flexible plastic material. A transfer port 38' is disposed in the inner element 26', which connects the annular channel 4 with the throttle bore 40' and thereby with the bridging cavity 33'.

In the same way as in the embodiment example according to FIG. 1, the opening angle β of the conical expanded portion 42' in the embodiment example according to FIG. 2 is very small. It is about as large as the angle α, namely in the vicinity of 1° to 2°. On the other hand, the inclination angle γ of the wedge surfaces 36, 37 towards the axis 8 in the embodiment according to FIG. 1 and the angle γ' of the wedge surfaces 36', 37' towards the axis 8' in the embodiment example according to FIG. 2, is considerably larger, namely in the area of 20° to 40°. As a result of this, during the assembly of the entire gas spring any differences in length present in the area of the conical section 41, 41' are absorbed by the conical expanded portion 42, 42', since it is possible to have comparatively large axial displacement with very small radial distortion of the two parts. Since the inner elements 26 or 26' are comparatively resilient, the adjustment to different lengths mentioned before can take place here, without diminishing the gas-tight fit of the conical section 41 on the conical expanded portion 42 or of the conical section 41' at the conical expanded portion 42'. This construction is tolerant of imperfections, and allows for adjustment in length of the gas spring.

Figure 3:
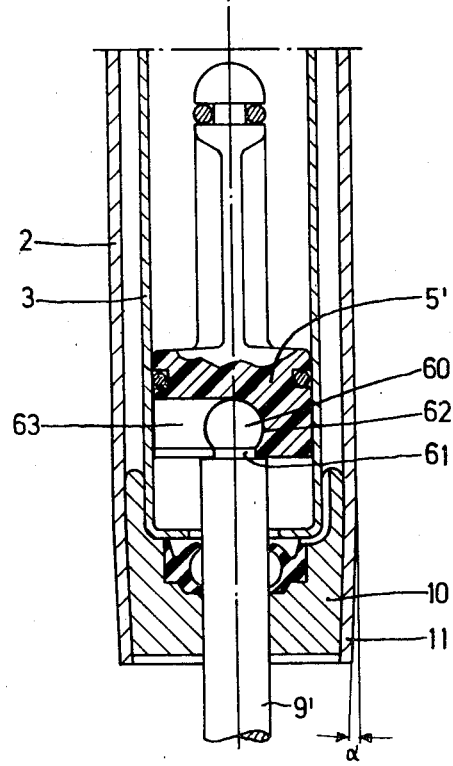
FIG. 3 shows an altered form of the connection of piston and piston rod of the gas spring.

In a variation of the connection between piston rod 9' and piston 5' according to FIG. 3, the piston rod 9' has, on its inner end, a portion 60 of a rounded shape, fabricated by rolling or pressing, i.e. without the necessity of machining, and which has a contraction 61 narrow with respect to the diameter of the piston rod 9'. The piston 5' is equipped with a recess 62 corresponding to the rounded portion 60 with its contraction 61. At the same time, the piston 5' may have several slits 63 distributed on its surface, which extend from the recess 62 along its entire axial length radially to the outer circumference of the piston 5'. Since the piston is made from an elastically deformable material, namely a suitable plastic material, the piston rod 9' can be connected to the piston 5' by engaging the rounded portion 60 and the contraction 61 in the area of the slits 63, while the piston 5' is elastically deformed. As the piston 5' in its finally assembled form fits the inner surface of the inner tube 3, the connection between the piston rod 9' and the piston 5' is not likely to be severed, because the piston 5' cannot move or expand in a radial direction.

The plug 10 cannot only be made from a suitable plastic material—as described above—but also from a metal softer than the steel of which the outer tube 2 consists. For example, die-cast zinc has been shown to be a suitable material for the plug 10. Between these two parts, too, a gas-tight fit is achieved through metallic sealing, since while forcing the conical plug 10 into the conical section 11 of the outer tube, this section will be slightly expanded elastically, while the plug 10 is being slightly deformed. Tests have shown that a gas-tight metallic connection can be achieved hereby, without having to rework the conical area of the plug 10 or the conical section 11 of the outer tube at the appropriate surfaces by abrading or the like.

The foregoing description of the specific embodiment will so fully reveal the general nature of the invention that others can, by applying current knowledge, readily modify and/or adapt for various applications such specific embodiment without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation.

What is claimed is:

1. In a longitudinally adjustable gas spring, comprising a housing filled with gas under pressure and formed by an outer tube (2) having a rim and an inner tube (3) coaxially disposed therein and forming a gas-filled interior volume and an annular channel; a closed piston sealed against the inner tube and axially movable therein to define a variable partial housing volume on each side of said piston; a piston rod connected to said piston and sealingly protruding through a plug at one end of the housing; and a valve comprising a valve stem and a valve body disposed at the other end of the housing for the regulated connection of the partial housing volumes located on either side of the piston by way of the annular channel, which annular channel is also connected with the interior volume in the vicinity of the plug, said valve body having said valve stem disposed therewithin which closes or opens gas port bores and which is sealed against the valve body, and said valve body and said plug being braced axially against the inner tube and sealed against the inner wall of the outer tube, the improvement wherein the valve body (23, 23') and the plug (10) are made from a softer material than the outer tube (2);

the plug (10) is provided with a sealing surface conically tapering in the direction of the adjacent housing and is placed in a section (11) of the outer tube (2) which has corresponding conical taper;

the valve body consists of an outer element (27, 27') and an inner element (26, 26'), wherein said elements are provided with corresponding conical wedge surface (36, 37, 36', 37') for the radial pressure sealing of said two elements of the valve body (23, 23') against the inner wall of the outer tube (2), and the valve body (23, 23') has a section (41, 41') which is conically tapered toward the interior volume (20, 20') of the housing (1), and which is tightly and surface-sealingly disposed in a corresponding conical expanded portion (42, 42') of the inner tube (3), the seal between the outer tube (2) and the valve body (23,23') being achieved by an axial bracing by means of flanging the rim (55) of the outer tube (2) under axial pressure.

2. Gas spring according to claim 1, wherein said outer element comprises a seal flange which abuts with its outer surface against the inner surface of the outer tube, the wedge surface of said outer element being disposed on the opposite surface of the seal flange from said outer surface and lying radially towards the center.

3. Gas spring according to claim 1, wherein said inner element comprises a seal flange which abuts with its outer surface against the inner surface of the outer tube, the wedge surface of said inner element being disposed on the opposite surface of the seal flange from its said outer surface and lying radially towards the center.

4. Gas spring according to claim 1, wherein the piston is connected to the piston rod by means of a plug connection.

5. Gas spring according to claim 4, wherein the piston is connected to the piston rod by means of a radial plug connection.

6. Gas spring according to claim 4, wherein the piston is connected to the piston rod by means of an axial plug connection.

7. Gas spring according to claim 6, wherein the piston is connected to the piston rod by means of an elastic arresting connection.

8. Gas spring with a sealing element disposed on the piston and with a valve area limiting sleeve associated spatially with the valve, which sealing element and limiting sleeve together form a limit suspension, according to claim 1, wherein at least one of the sealing element or the limiting sleeve is formed as one piece with, respectively, the piston and the valve body.

9. Gas spring according to claim 8, wherein the valve limiting sleeve is formed as one piece with the inner element of the valve body.

10. Gas spring according to claim 1, wherein the plug is formed of a hardened or elastic plastic material.

11. Gas spring according to claim 1, wherein the plug is formed of die-cast zinc.

12. Gas spring according to claim 1, wherein the valve body, at least in part, is formed of a hardened elastic plastic material.

13. Gas spring according to claim 1, wherein the valve body at least in part is formed of die-cast zinc.

14. Gas spring according to claim 1, wherein the opening angle between the axis of the gas spring and the conical expanded portion of the inner tube is considerably smaller than the corresponding opening angle to the longitudinal axis of the wedge surfaces.

15. Gas spring according to claim 1, wherein at least one of said gas port bores passes through said wedge surfaces thereby connecting the annular channel with the valve.

* * * * *